United States Patent
Ciapala et al.

(10) Patent No.: US 10,639,737 B1
(45) Date of Patent: May 5, 2020

(54) WELDING SYSTEM AND METHOD

(71) Applicant: Aptiv Technologies Limited, St. Michael (BB)

(72) Inventors: Frank A. Ciapala, Youngstown, OH (US); Nathan F. Uzarski, Greenville, PA (US)

(73) Assignee: Aptiv Technologies Limited (BB)

( * ) Notice: Subject to any disclaimer, the term of this patent is extended or adjusted under 35 U.S.C. 154(b) by 0 days.

(21) Appl. No.: 16/164,998

(22) Filed: Oct. 19, 2018

(51) Int. Cl.
| | |
|---|---|
| *B23K 9/095* | (2006.01) |
| *B23K 9/007* | (2006.01) |
| *B23K 9/10* | (2006.01) |
| *B23K 31/12* | (2006.01) |
| *B23K 101/36* | (2006.01) |

(52) U.S. Cl.
CPC ............ *B23K 9/0953* (2013.01); *B23K 9/007* (2013.01); *B23K 9/0956* (2013.01); *B23K 9/1062* (2013.01); *B23K 9/1087* (2013.01); *B23K 31/125* (2013.01); *B23K 2101/36* (2018.08); *G05B 2219/45135* (2013.01)

(58) Field of Classification Search
CPC .... B23K 9/0953; B23K 9/007; B23K 9/1087; B23K 9/1062; B23K 31/125; B23K 9/0956; B23K 2101/36; G05B 2219/45135
See application file for complete search history.

(56) References Cited

U.S. PATENT DOCUMENTS

| | | | | |
|---|---|---|---|---|
| 10,324,066 | B1 * | 6/2019 | Davis | G01N 29/043 |
| 2009/0152253 | A1 * | 6/2009 | Wang | B23K 31/12 |
| | | | | 219/137 R |
| 2010/0224610 | A1 * | 9/2010 | Wallace | B23K 9/0953 |
| | | | | 219/137 R |
| 2010/0314362 | A1 * | 12/2010 | Albrecht | B23K 9/0953 |
| | | | | 219/121.63 |
| 2016/0267806 | A1 * | 9/2016 | Hsu | G09B 19/24 |

\* cited by examiner

*Primary Examiner* — Rocio Del Mar Perez-Velez
*Assistant Examiner* — Vi N Tran
(74) *Attorney, Agent, or Firm* — Robert J. Myers

(57) ABSTRACT

A welding system includes a welder, a human-machine-interface, an identification-device, a test-device, a memory, and a controller-circuit. The welder creates an assembly between electrical-components. The human-machine-interface receives an input from an operator and displays instructions to the operator. The identification-device creates a label identifying the assembly. The test-device produces test-data of the weld-joint. The memory stores welder-process-data of the weld-joint. The controller-circuit activates the welder, stores the welder-process-data in the memory, determines whether the welder-process-data violates a quality-metric, determines a number of violating-weld-joints, activates an alert-device to alert the operator to violating-weld-joints, disables the welder when a number of violating-weld-joints exceeds a threshold, activates the identification-device to create the label, instructs the operator to attach the label to the assembly having the violating-weld-joints, instructs the operator to perform a test of the violating-weld-joints with the test-device, and stores the test-data of the violating-weld-joints in the memory linked to the identity.

14 Claims, 3 Drawing Sheets

WELDING SYSTEM AND METHOD

TECHNICAL FIELD OF INVENTION

This disclosure generally relates to a welding system, and more particularly relates to a welding system that is remotely monitored.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
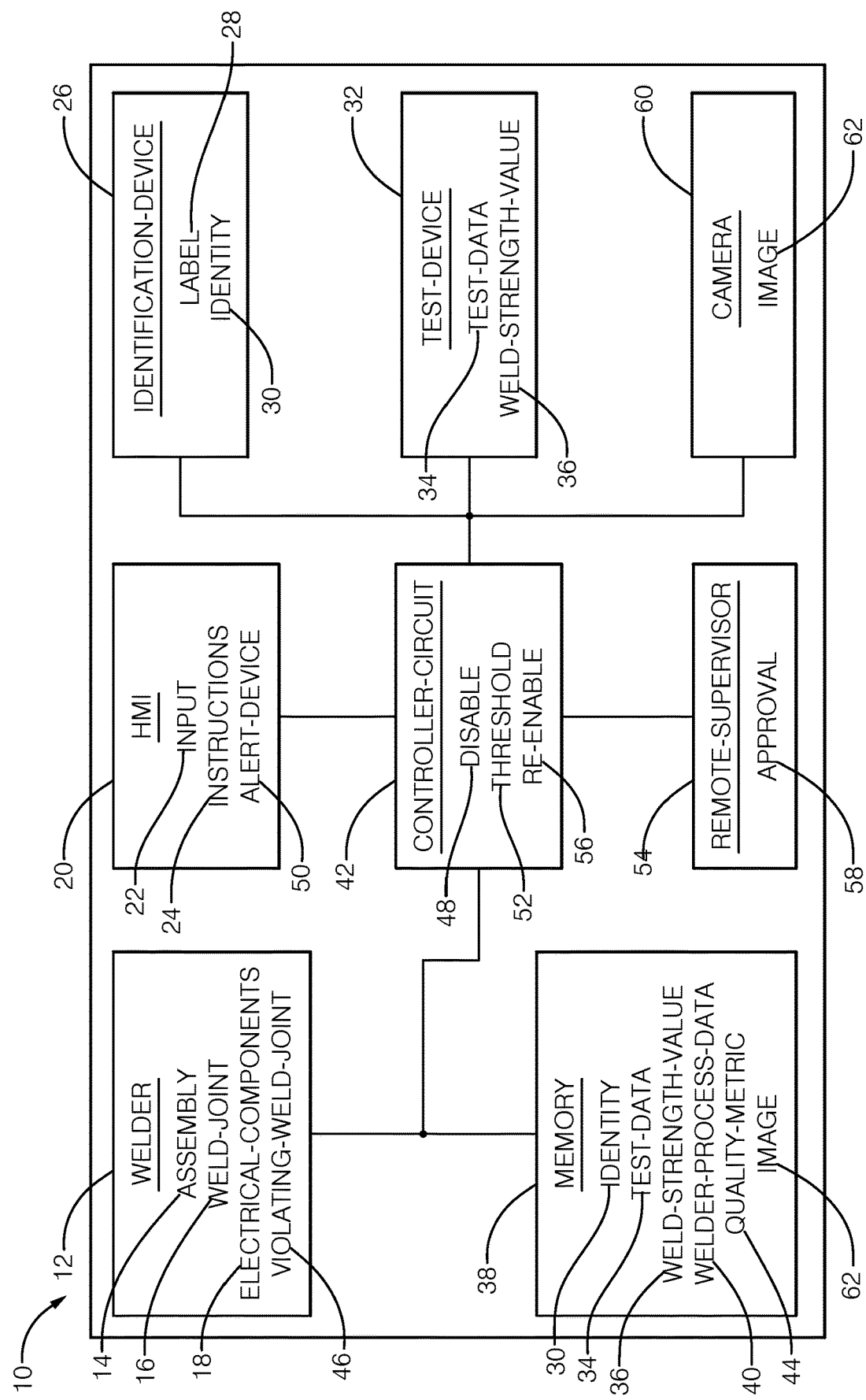
FIG. 1 is an illustration of a welding system in accordance with one embodiment.

FIG. 1 illustrates a welding system 10, hereafter referred to as the system 10. As will be described in more detail below, the system 10 in an improvement over other welding systems because the system 10 prevents a welder 12 from welding until tests are approved.

The system 10 includes the welder 12 configured to create an assembly 14 by forming a weld-joint 16 between electrical-components 18. The welder 12 may be any welder 12 capable of creating a metallurgical bond, and in the example illustrated in FIG. 1 the welder 12 is a sonic-welder. In one embodiment, the electrical-components 18 are wire-cables that are welded to one, another, creating a splice-joint. In another embodiment, the electrical-components 18 are wire-cables that are welded electrical-terminals.

The system 10 also includes a human-machine-interface 20 (HMI 20) configured to receive an input 22 to the system 10 from an operator (e.g. a human operator of the system 10) and display instructions 24 from the system 10 to the operator. The HMI 20 may be any HMI 20 and preferably is a display monitor (i.e., a cathode ray tube (CRT), a liquid crystal display (LCD), plasma display, light emitting diode (LED) display, or an organic light emitting diode (OLED) display for displaying information to the operator). The HMI 20 includes an input-device (not shown), including alphanumeric and other keys, and a cursor-control-device (not shown) for communicating direction information and command selections to the system 10 and for controlling cursor movement on the display (e.g., a mouse, a trackball, a touch-enabled display, or cursor direction keys).

The system 10 also includes an identification-device 26 configured to create a label 28 indicative of an identity 30 of the assembly 14. The identity 30 may include part numbers associated with the electrical-components 18 of the assembly 14, and/or metadata associated with the assembly 14. In one embodiment the identification-device 26 is a printer that prints a character (e.g., a bar code, part number, etc.) on a film configured to be attached to the assembly 14. In another embodiment, the identification-device 26 is a radio frequency identification (RFID) chip encoder that encodes an RFID chip that is configured to be attached to the assembly 14. In the example illustrated in FIG. 1, the identification-device 26 is the printer.

The system 10 also includes a test-device 32 configured to produce test-data 34 indicative of a characteristic of the weld-joint 16. The test-data 34 includes a weld-strength value 36 that may be measured by a tensile-test, or may be measured by a bend-test, both of which are destructive tests. In the example illustrated in FIG. 1, the test-device 32 is a tensile-test machine. According to alternative embodiments, the test-device may measure a height and a width of the weld-joint 16 or may perform imaging, e.g. ultrasonic or x-ray imaging of the weld-joint 16.

The system 10 also includes a memory 38 configured to store welder-process-data 40 generated by the welder 12 that is associated with the formation of the weld-joint 16. The memory 38 may reside in a cloud computing environment (i.e., "cloud" storage—not shown), or may reside locally with the welder 12. The memory 38 may be hard wired to the system 10, or may communicate through a communications channel configured to transmit digital data collected from the system 10. The welder-process-data 40 includes a cross-sectional area of the electrical-components 18, a pressure of a weld-head, an amplitude of the weld-current, a total energy delivered to the weld-joint 16, a weld compacting height, a weld compacting height reference, a weld-time, a weld-time-reference, a weld-height, a weld-height-reference, a weld-tool life, a weld-recipe, a weld-width, and a splice-sequence. The welder-process-data 40 is associated (i.e. linked) to the identity 30 of the assembly 14 in order to trace the assembly 14 throughout a manufacturing process. The memory 38 may be any non-transitory media that store the test-data 34. The memory 38 includes non-volatile-memory and/or volatile-memory. Non-volatile-memory includes, for example, optical disks, magnetic disks, solid-state drives, or three-dimensional cross point memory. Volatile-memory includes dynamic-memory. Common forms of storage-media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory-chip or cartridge. The storage medium may be local or cloud-based.

The system 10 also includes a controller-circuit 42 in communication with the welder 12, the HMI 20, the identification-device 26, the test-device 32, and the memory 38. The controller-circuit 42 is a special-purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques. In an embodiment, the controller-circuit 42 includes a bus (not specifically shown) or other communication mechanism for communicating information, and a hardware processor coupled with a bus for processing information. The hardware processor is, for example, a general-purpose microprocessor. The controller-circuit 42 also includes a main-memory (not shown), such as a random-access memory (RAM) or other dynamic storage device, coupled to the bus for storing information and instructions to be executed by processor. In one implementation, the main-memory is used for storing temporary variables or other intermediate information during execution of instructions to be executed by the processor. Such instructions, when stored in non-transitory storage media accessible to the processor, render the controller-circuit 42 into a special-purpose machine that is customized to perform the operations specified in the instructions.

In an embodiment, the controller-circuit 42 further includes a read-only-memory (ROM) or other static storage device coupled to the bus for storing static information and instructions for the processor. A storage device, such as a magnetic disk, optical disk, solid-state drive, or three-dimensional cross point memory is provided and coupled to the bus for storing information and instructions.

According to one embodiment, the techniques herein are performed by the controller-circuit 42 in response to the processor executing one or more sequences of one or more instructions contained in the main-memory. Such instructions are read into the main-memory from another storage medium, such as the storage device. Execution of the sequences of instructions contained in the main-memory causes the processor to perform the process steps described herein. In alternative embodiments, hard-wired circuitry is used in place of or in combination with software instructions.

Storage media is distinct from but may be used in conjunction with transmission media. Transmission media participates in transferring information between storage media. For example, transmission media includes coaxial cables, copper wire and fiber optics, including the wires that comprise the bus. Transmission media can also take the form of acoustic, electromagnetic, or light waves, such as those generated during radio-wave and infrared data communications.

In an embodiment, various forms of media are involved in carrying one or more sequences of one or more instructions to the processor for execution. For example, the instructions are initially carried on a magnetic disk or solid-state drive of a remote computer. The remote computer loads the instructions into its dynamic memory and sends the instructions over a telephone line using a modem. A modem (not shown) local to the controller-circuit 42 receives the data on the telephone line and uses an infrared transmitter to convert the data to an infrared signal. An infrared detector receives the data carried in the infrared signal and appropriate circuitry places the data on the bus. The bus carries the data to the main-memory, from which the processor retrieves and executes the instructions. The instructions received by the main-memory may optionally be stored on the storage device either before or after execution by processor.

The controller-circuit 42 also includes a communication interface (not shown) coupled to the bus. The communication interface provides a two-way data communication coupling to a network link that is connected to a local network. For example, the communication interface is an integrated service digital network (ISDN) card, cable modem, satellite modem, or a modem to provide a data communication connection to a corresponding type of telephone line. As another example, the communication interface is a local area network (LAN) card to provide a data communication connection to a compatible LAN. In some implementations, wireless links are also implemented. In any such implementation, the communication interface sends and receives electrical, electromagnetic, or optical signals that carry digital data streams representing various types of information.

The network link typically provides data communication through one or more networks to other data devices. For example, the network link provides a connection through the local network to a host computer or to a cloud data center or equipment operated by an Internet Service Provider (ISP). The ISP in turn provides data communication services through the world-wide packet data communication network now commonly referred to as the "Internet". The local network and Internet both use electrical, electromagnetic or optical signals that carry digital data streams. The signals through the various networks and the signals on the network link and through the communication interface, which carry the digital data to and from the controller-circuit 42, are example forms of transmission media. In an embodiment, the network contains the cloud or a part of the cloud described above.

The controller-circuit 42 sends messages and receives data, including program code, through the network(s), the network link, and the communication interface. In an embodiment, the controller-circuit 42 receives code for processing. The received code is executed by the processor as it is received, and/or stored in storage device, or other non-volatile storage for later execution.

The controller-circuit 42 is configured to activate the welder 12 to create the assembly 14 and store the welder-process-data 40 in the memory 38 linked to the identity 30. The controller-circuit 42 determines whether the welder-process-data 40 violates a quality-metric 44 that is stored in the memory 38 by comparing the welder-process-data 40 to the quality-metric 44. The quality-metric 44 includes process data based metrics, as well as environmental metrics that are independent of the process data based metrics at a given instant (e.g., time between process parts, every specific number of parts, etc). The controller-circuit 42 also monitors the welder-process-data 40 in real-time using a logic-algorithm to establish limit violation trends. In an embodiment, the controller-circuit 42 activates the welder 12 to create a predetermined number of assemblies 14 in order to generate a sample size representative of the population of the assemblies 14. The predetermined number of assemblies 14 may be any quantity defined by the user, and is preferably greater than 30 assemblies 14.

In accordance with the determination that the welder-process-data 40 violates the quality-metric 44, the controller-circuit 42 is further configured to determine a number (i.e. a quantity, count, etc.) of violating-weld-joints 46 and activate an alert-device 50 to alert the operator to the violating-weld-joints 46. The alert-device 50 is preferably an indicia that is displayed to the operator through the HMI 20 and may include text, light, sound, or any combination thereof.

The controller-circuit 42 disables 48 the welder 12 when the number of violating-weld-joints 46 exceeds a threshold 52. The threshold 52 may be user defined and may be based on a quality control plan. The threshold 52 may be applied to any of the welder-process-data 40, as well as the environmental metrics described above.

The controller-circuit 42 activates the identification-device 26 to create the label 28 and instructs the operator to attach the label 28 to the assemblies 14 having the violating-weld-joints 46. Once the assembly 14 is labeled the controller-circuit 42 instructs the operator to perform a test of the violating-weld-joints 46 with the test-device 32. The operator may link the test of the violating-weld-joints 46 to the identity 30 by entering the identity 30 into the system 10 by scanning the label 28 with a scanning-device (not shown) or by manually entering the identity 30 using the HMI 20. In an embodiment, the controller-circuit 42 activates the identification-device 26 to create labels 28 for all of the predetermined number of assemblies 14 and instructs the operator to attach the labels 28 to all of the predetermined number of assemblies 14 and perform the test of all the weld-joints 16 with the test-device 32.

The controller-circuit 42 stores the test-data 34 of the violating-weld-joints 46 in the memory 38 linked to the identity 30, enabling a real-time access to the test-data 34 and welder-process-data 40 for the system 10. In an embodiment, the controller-circuit 42 stores the test-data 34 of all of the predetermined number of assemblies 14 in the memory 38 linked to the identity 30, regardless of whether the weld-joints 16 are considered violating-weld-joints 46. This has the technical benefit of enabling part traceability throughout the process through a central-database.

The system 10 further includes a remote-supervisor 54 in communication with the controller-circuit 42. The remote-supervisor 54 is also alerted by the alert-device 50 in accordance with the determination that the welder-process-data 40 violates the quality-metric 44. The remote-supervisor 54 may be a remote computer that is programmed to compare the welder-process-data 40 and the test-data 34 to the quality-metric 44 and make a determination whether to re-enable 56 the welder 12, whereby the controller-circuit 42 re-enables 56 the welder 12 based on an approval 58 by the remote-supervisor 54.

The system 10 further includes a camera 60 in communication with the controller-circuit 42. The camera 60 is configured to render an image 62 of the weld-joint 16, wherein the controller-circuit 42 is further configured to store the image 62 in the memory 38 linked to the identity 30. The camera 60 may be any camera 60 that is capable of capturing a digital image 62 of the weld-joint 16 and preferably has a resolution of at least 4 megapixels.

Figure 2:
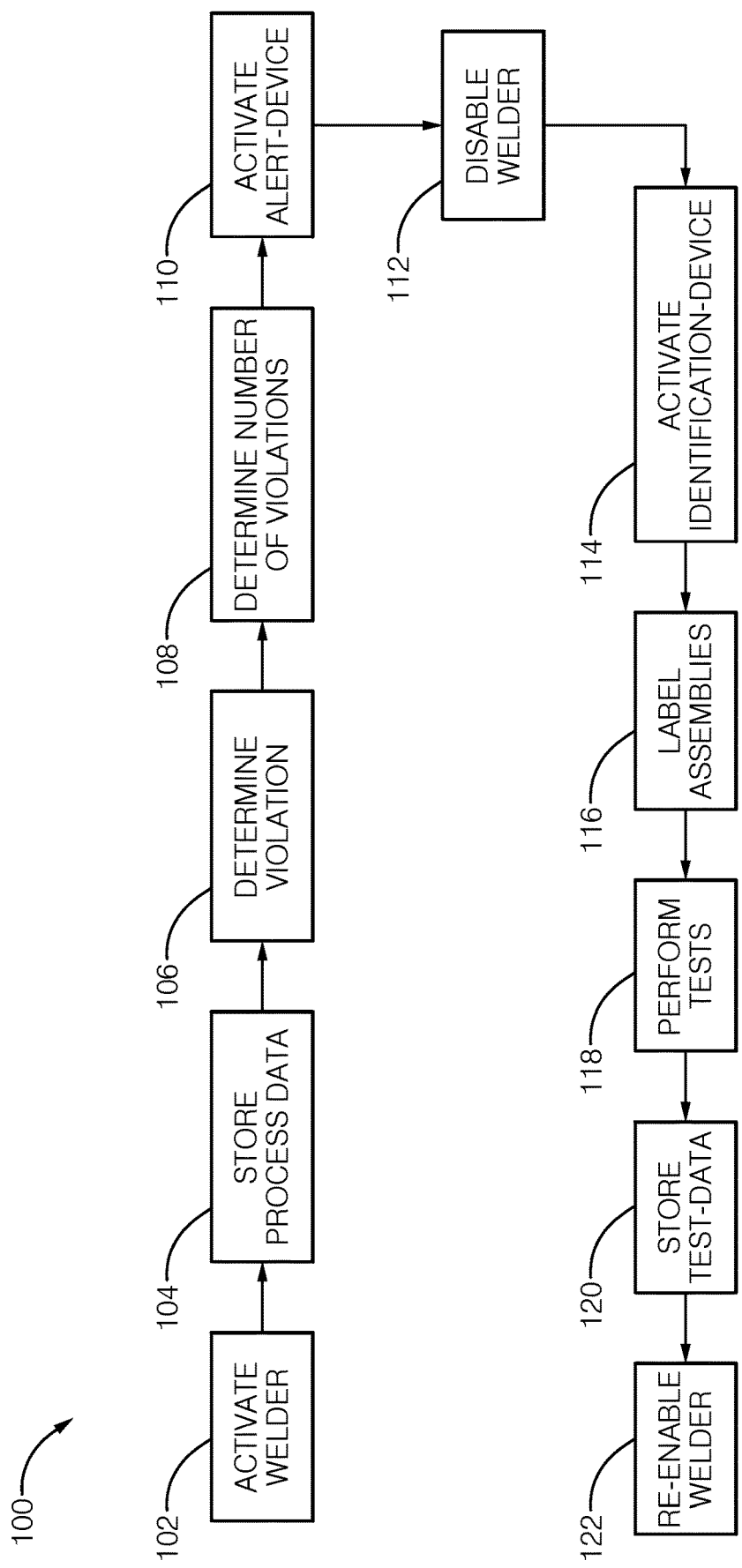
FIG. 2 is a flow chart illustrating a welding method using the welding system of FIG. 1 in accordance with another embodiment.

FIG. 2 is a flow chart illustrating a welding method 100 using the system 10 illustrated in FIG. 1.

Step 102, ACTIVATE WELDER, includes activating a welder 12, with the controller-circuit 42, to create the assembly 14 by forming the weld-joint 16 between electrical-components 18.

Step 104, STORE PROCESS-DATA, includes storing in the memory 38, with the controller-circuit 42, welder-process-data 40 associated with the weld-joint 16 linked to the identity 30 of the assembly 14.

Step 106, DETERMINE VIOLATION, includes determining, with the controller-circuit 42, whether the welder-process-data 40 violates the quality-metric 44 as described above.

Step 108, DETERMINE NUMBER OF VIOLATIONS, includes determining, with the controller-circuit 42, the number of violating-weld-joints 46.

Step 110, ACTIVATE ALERT-DEVICE, includes activating, with the controller-circuit 42, the alert-device 50 alerting the operator to the violating-weld-joints 46.

Step 112, DISABLE WELDER, includes disabling, with the controller-circuit 42, the welder 12 when the number of violating-weld-joints 46 is greater than the threshold 52 as described above.

Step 114, ACTIVATE IDENTIFICATION-DEVICE, includes activating, with the controller-circuit 42, the identification-device 26 to create the label 28 indicative of the identity 30 of the assemblies 14 having the violating-weld-joints 46.

Step 116, LABEL ASSEMBLIES, includes instructing, with the controller-circuit 42 through the HMI 20, the operator to attach the label 28 to the assemblies 14 having the violating-weld-joints 46.

Step 118, PERFORM TESTS, includes instructing, with the controller-circuit 42 through the HMI 20, the operator to perform tests of the assemblies 14 having the violating-weld-joints 46 with the test-device 32, thereby producing test-data 34 indicative of a characteristic of the weld-joints 16.

Step 120, STORE TEST-DATA, includes storing, with the controller-circuit 42, the test-data 34 in the memory 38 linked to the identity 30. The system 10 further includes the camera 60 in communication with the controller-circuit 42. The camera 60 renders the image 62 of the weld-joint 16, whereby the controller-circuit 42, stores the image 62 in the memory 38 linked to the identity 30.

Step 122, RE-ENABLE WELDER, includes re-enabling 56, with the controller-circuit 42, the welder 12 based on the approval 58 by the remote-supervisor 54 in communication with the controller-circuit 42. The remote-supervisor 54 is also alerted by the alert-device 50 in accordance with the determination that the welder-process-data 40 violates the quality-metric 44, as described above.

Figure 3:
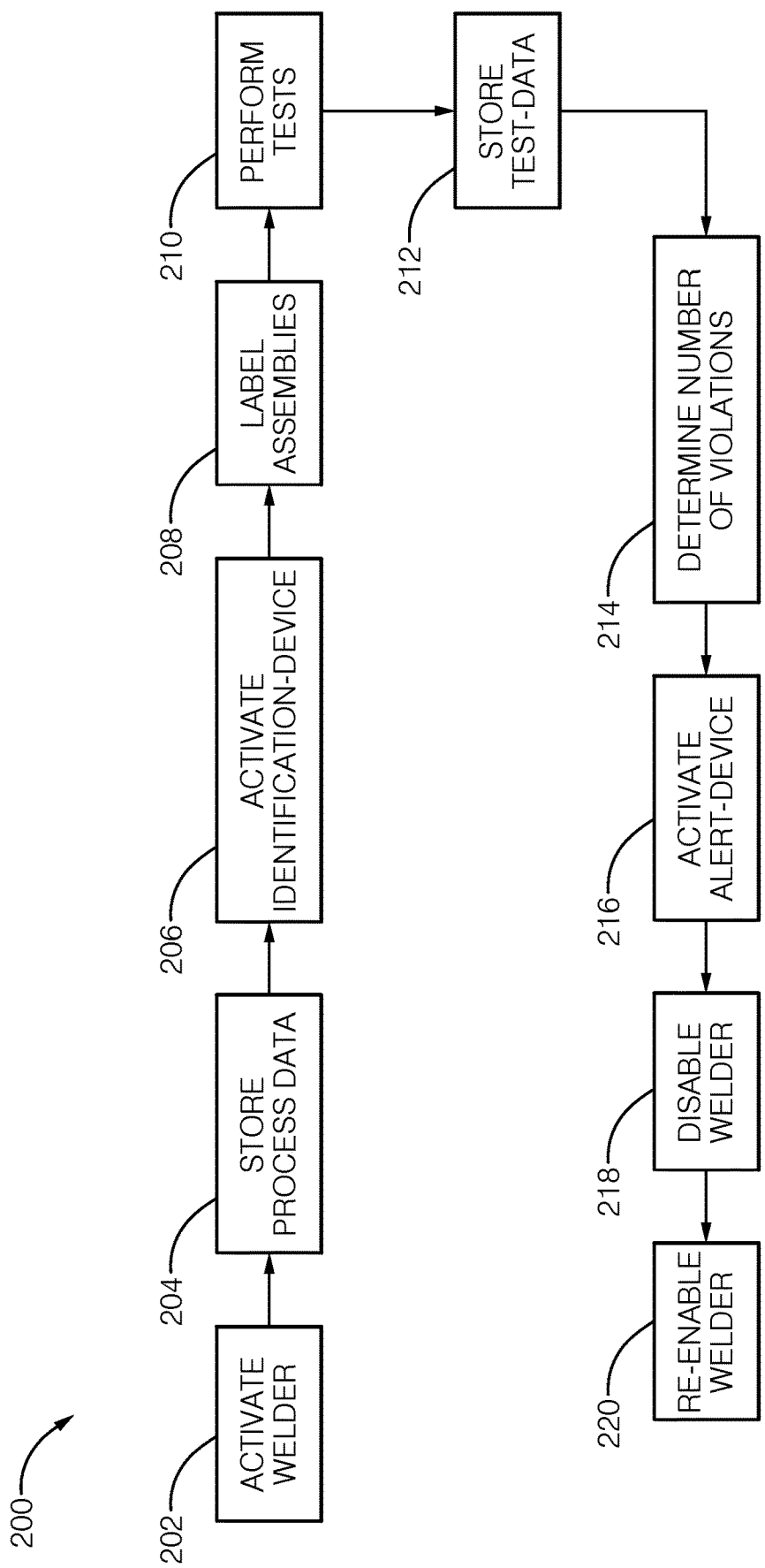
FIG. 3 is a flow chart illustrating a welding method using the welding system of FIG. 1 in accordance with yet another embodiment.

FIG. 3 is another flow chart illustrating another welding method 200 using the system 10 illustrated in FIG. 1.

Step 202, ACTIVATE WELDER, includes activating the welder 12, with the controller-circuit 42, to create the predetermined number of assemblies 14 by forming the weld-joint 16 between electrical-components 18.

Step 204, STORE PROCESS-DATA, includes storing in the memory 38, with the controller-circuit 42, welder-process-data 40 associated with the weld-joint 16 linked to the identities 30 of the predetermined number of assemblies 14.

Step 206, ACTIVATE IDENTIFICATION-DEVICE, includes activating, with the controller-circuit 42, the identification-device 26 to create labels 28 indicative of the identities 30 of the predetermined number of assemblies 14.

Step 208, LABEL ASSEMBLIES, includes instructing, with the controller-circuit 42 through the HMI 20, the operator to attach the labels 28 to the predetermined number of assemblies 14.

Step 210, PERFORM TESTS, includes instructing, with the controller-circuit 42 through the HMI 20, the operator to perform tests of the predetermined number of assemblies 14 with the test-device 32, thereby producing test-data 34 indicative of a characteristic of the weld-joints 16.

Step 212, STORE TEST-DATA, includes storing, with the controller-circuit 42, the test-data 34 in the memory 38 linked to the identity 30 of the predetermined number of assemblies 14. The system 10 further includes the camera 60 in communication with the controller-circuit 42. The camera 60 renders the image 62 of the weld-joints 16, whereby the controller-circuit 42, stores the images 62 in the memory 38 linked to the identities 30 of the predetermined number of assemblies 14.

Step 214, DETERMINE NUMBER OF VIOLATIONS includes determining, with the controller-circuit 42, whether the welder-process-data 40 violates the quality-metric 44 as described above, and includes determining the number of violating-weld-joints 46.

Step 216, ACTIVATE ALERT-DEVICE includes activating, with the controller-circuit 42, the alert-device 50 alerting the operator to the violating-weld-joints 46.

Step 218, DISABLE WELDER, includes disabling, with the controller-circuit 42, the welder 12 when the number of violating-weld-joints 46 is greater than the threshold 52 as described above.

Step 220, RE-ENABLE WELDER, includes re-enabling 56, with the controller-circuit 42, the welder 12 based on the approval 58 by the remote-supervisor 54 in communication with the controller-circuit 42. The remote-supervisor 54 is also alerted by the alert-device 50 in accordance with the determination that the welder-process-data 40 violates the quality-metric 44, as described above.

While this invention has been described in terms of the preferred embodiments thereof, it is not intended to be so limited, but rather only to the extent set forth in the claims that follow. "One or more" includes a function being performed by one element, a function being performed by more than one element, e.g., in a distributed fashion, several functions being performed by one element, several functions being performed by several elements, or any combination of the above. It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

We claim:

1. A welding system, said system comprising:
   a welder configured to create an assembly by forming a weld-joint between electrical-components;
   a human-machine-interface configured to receive an input to the system from an operator and display instructions from the system to the operator;
   an identification-device configured to create a label indicative of an identity of the assembly;
   a test-device configured to produce test-data indicative of a characteristic of the weld-joint;
   a memory configured to store welder-process-data associated with the formation of the weld-joint; and
   a controller-circuit in communication with the welder, the human-machine-interface, the test-device, and the memory, the controller-circuit configured to:
   activate the welder to create the assembly;
   store the welder-process-data in the memory linked to the identity;
   determine whether the welder-process-data violates a quality-metric;
   in accordance with the determination that the welder-process-data violates the quality-metric, the controller-circuit is further configured to:
   determine a number of violating-weld-joints;
   activate an alert-device to alert the operator to a violating-weld-joint;
   disable the welder when the number of violating-weld-joints exceeds a threshold;
   activate the identification-device to create the label;
   instruct the operator to attach the label to the assembly having the violating-weld-joint;
   instruct the operator to perform a test of the violating-weld-joint with the test-device; and
   store the test-data of the violating-weld-joint in the memory linked to the identity.

2. The system in accordance with claim 1, wherein the system further includes a remote-supervisor in communication with the controller-circuit, the remote-supervisor alerted by the alert-device in accordance with the determination that the welder-process-data violates the quality-metric, whereby the controller-circuit reenables the welder based on an approval by the remote-supervisor.

3. The system in accordance with claim 1, wherein the test-data includes a weld-strength value.

4. The system in accordance with claim 1, wherein the system further includes a camera in communication with the controller-circuit, the camera configured to render an image of the weld-joint, wherein the controller-circuit is further configured to store the image in the memory linked to the identity.

5. A welding method, said method comprising:
   activating a welder to create an assembly by forming a weld-joint between electrical-components with a controller-circuit;
   the controller-circuit in communication with the welder, a human-machine-interface, an identification-device, a test-device, and a memory;
   storing in the memory, with the controller-circuit, welder-process-data associated with the weld-joint linked to an identity of the assembly;
   determining, with the controller-circuit, whether the welder-process-data violates a quality-metric;
   in accordance with the determination that the welder-process-data violates the quality-metric;
   determining, with the controller-circuit, a number of violating-weld-joints;
   activating, with the controller-circuit, an alert-device alerting an operator to a violating-weld-joints;

disabling, with the controller-circuit, the welder when the number of violating-weld-joints is greater than a threshold;

activating the identification-device to create a label indicative of the identity of the assemblies with the violating-weld-joints;

instructing, with the controller-circuit through the human-machine-interface, the operator to attach the label to the assemblies having the violating-weld-joints;

instructing, with the controller-circuit through the human-machine-interface, the operator to perform tests of the assemblies having the violating-weld-joints with the test-device, thereby producing test-data indicative of a characteristic of the weld-joints; and storing, with the controller-circuit, the test-data in the memory linked to the identity.

6. The method in accordance with claim 5, wherein the system further includes a remote-supervisor in communication with the controller-circuit, the remote-supervisor alerted by the alert-device in accordance with the determination that the welder-process-data violates the quality-metric, further including the step of reenabling, with the controller-circuit, the welder based on an approval by the remote-supervisor.

7. The method in accordance with claim 5, wherein the system further includes a camera in communication with the controller-circuit, the camera configured to render an image of the weld-joint, further including the step of, storing, with the controller-circuit, the image in the memory linked to the identity.

8. A welding system, said system comprising:
a welder configured to create an assembly by forming a weld-joint between electrical-components;
a human-machine-interface configured to receive an input to the system from an operator and display instructions from the system to the operator;
an identification-device configured to create a label indicative of an identity of the assembly;
a test-device configured to produce test-data indicative of a characteristic of the weld-joint;
a memory configured to store welder-process-data associated with the formation of the weld-joint; and
a controller-circuit in communication with the welder, the human-machine-interface, the identification-device, the test-device, and the memory;
the controller-circuit configured to:
  activate the welder to create a predetermined number the assemblies;
  store the welder-process-data from the predetermined number of the assemblies in the memory linked to the identity;
  activate the identification-device to create labels for the predetermined number of the assemblies;
  instruct the operator to apply the labels to the predetermined number of the assemblies;
  instruct the operator to perform a test of the predetermined number of the assemblies with the test-device;
  store the test-data of each of the predetermined number of the assemblies in the memory linked to the identity;
  determine whether the welder-process-data and the test-data violates a quality-metric;
  in accordance with the determination that the welder-process-data and the test-data violates the quality-metric;
    activate an alert-device based on the violation; and
    disable the welder.

9. The system in accordance with claim 8, wherein the system further includes a remote-supervisor in communication with the controller-circuit, the remote-supervisor alerted by the alert-device in accordance with the determination that the welder-process-data and the test-data violates the quality-metric, whereby the controller-circuit reenables the welder based on an approval by the remote-supervisor.

10. The system in accordance with claim 8, wherein the test-data includes a weld-strength value.

11. The system in accordance with claim 8, wherein the system further includes a camera in communication with the controller-circuit, the camera configured to render an image of the weld-joint, wherein the controller-circuit is further configured to store the image in the memory linked to the identity.

12. A welding method, said method comprising:
activating a welder, with a controller-circuit, to create a predetermined number of assemblies by forming a weld-joint between electrical-components;
  the controller-circuit in communication with the welder, a human-machine-interface, an identification-device, a test-device, and a memory;
storing in the memory, with the controller-circuit, welder-process-data from the predetermined number of assemblies linked to an identity of the assemblies;
activating the identification-device, with the controller-circuit, to create labels indicative of the identity of the predetermined number of the assemblies;
instructing, with the controller-circuit through the human-machine-interface, an operator to attach the labels to the predetermined number of the assemblies;
instructing, with the controller-circuit through the human-machine-interface, the operator to perform a test of the predetermined number of the assemblies with the test-device, thereby producing test-data indicative of a characteristic of the weld-joint;
storing, with the controller-circuit, the test-data of each of the predetermined number of the assemblies in the memory linked to the identity;
determining, with the controller-circuit, whether the welder-process-data and the test-data violates a quality-metric;
  in accordance with the determination that the welder-process-data and the test-data violates the quality-metric;
    activating, with the controller-circuit, an alert-device alerting the operator based on the violation; and
    disabling the welder with the controller-circuit.

13. The method in accordance with claim 12, wherein the system further includes a remote-supervisor in communication with the controller-circuit, the remote-supervisor alerted by the alert-device in accordance with the determination that the welder-process-data and the test-data violates the quality-metric, further including the step of reenabling, with the controller-circuit, the welder based on an approval by the remote-supervisor.

14. The method in accordance with claim 12, wherein the system further includes a camera in communication with the controller-circuit, the camera configured to render an image of the weld-joint, further including the step of, storing, with the controller-circuit, the image in the memory linked to the identity.

* * * * *